Figure 1:
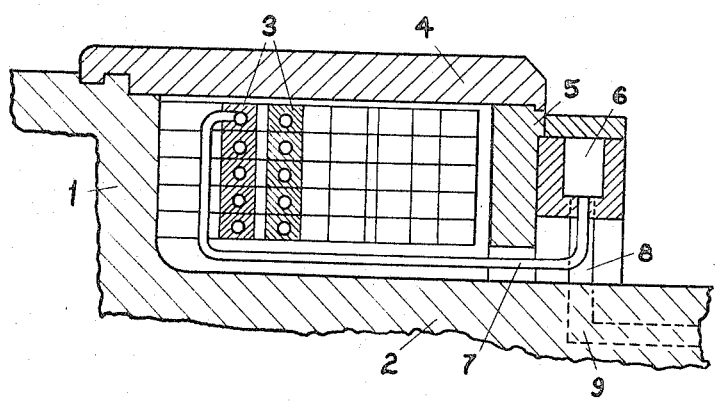

Sept. 5, 1967          E. WIEDEMANN                3,340,412
ARRANGEMENT FOR THE DIRECT LIQUID COOLING OF
    A TURBOGENERATOR PROVIDED WITH END TURN
                 RETAINING RINGS
              Filed Aug. 23, 1965

INVENTOR.
Eugen Wiedemann
BY

United States Patent Office 3,340,412
Patented Sept. 5, 1967

3,340,412
ARRANGEMENT FOR THE DIRECT LIQUID COOLING OF A TURBOGENERATOR PROVIDED WITH END TURN RETAINING RINGS
Eugen Wiedemann, Baden, Aargau, Switzerland, assignor to Aktiengesellschaft Brown, Boveri & Cie, Baden, Switzerland, a joint-stock company
Filed Aug. 23, 1965, Ser. No. 481,538
Claims priority, application Switzerland, Aug. 28, 1964, 11,327/64
9 Claims. (Cl. 310—54)

The present invention is directed to an improved construction for the rotor winding of a turbogenerator which is directly cooled by means of a liquid, particularly water.

With cooling arrangements of this kind where the cooling liquid flows through the hollow conductors of the winding, the cooling liquid is supplied and discharged through axial conduits in the body of the rotor and these are in turn in communication with the hollow conductors of the winding by way of radial bores and flexible pipes.

The accommodation of the large number of pipe connections within the annular coil end chambers which are shut off by rotor caps is, however, difficult, due to the limited space available, and furthermore, a supervision of the connections is also greatly handicapped, so that it has been proposed that the various groups of pipe connections should be arranged outside the coil end chambers. The disadvantage of such an arrangement is that the comparatively large number of radial bores which thus have to be provided in the shaft ends of the rotor as connections between the axial rotor conduits and the pipes, result in an inadmissible reduction in the mechanical strength of the rotor shaft.

Liquid-cooled rotor windings for turbogenerators are also known where each coil of the rotor winding is associated with two distribution chambers, one for supplying the liquid to, and the other one for discharging it from, the coil, these chambers being located directly underneath the lowest conductor of the coil, there being a connection between these chambers and each individual hollow conductor. A disadvantage of this arrangement is also that the various connections are very inaccessible. Moreover, the distribution chambers are rigidly fixed to the rotor shaft so that practically no relative axial expansion of the copper conductors with respect to that of the iron rotor is possible.

The object of the present invention is to provide an arrangement for directly cooling, with a liquid, the rotor winding of a turbogenerator having end turn retaining rings which are not rigidly joined to the rotor shaft, and where the hollow conductors of the rotor winding are in communication with pipes and distribution chambers for the supply and discharge of the liquid, whereby when compared with existing arrangements this new arrangement is simpler and more favorable and avoids the aforementioned disadvantages of hitherto known cooling systems. This is achieved in accordance with the invention by securing the distribution chambers upon the end turn retaining ring, using rigid pipes to connect the distribution chambers with the hollow conductor end turns, and using a relatively small number of flexible pipe connections between the distribution chambers and axially extending fluid passageways within the rotor.

Two constructional examples of the arrangement according to the invention are now explained with reference to the drawing where FIGS. 1 and 2 each show partly in longitudinal section one end of the rotor of a turbogenerator.

In FIG. 1 reference numeral 1 indicates the rotor body and 2 the rotor shaft, while the end turns of the liquid cooled rotor winding consist of hollow conductors 3. These end turns 3 are held in position by an end turn retaining ring which comprises a cylindrical ring portion 4 which on the one hand is shrunk on to the rotor 1, and on the other hand is rigidly connected to an annular end plate 5 by the shrink fit. Between the bore of the end plate 5 and the rotor shaft 2 there is a clearance.

With the constructional example shown in FIG. 1, it is assumed that with the turbogenerator being considered, the cooling liquid flows through an odd number of half turns of the rotor winding arranged hydraulically in series. In this case an annular distribution chamber 6 is arranged on the outside of the end plate part 5 of the end turn retaining ring which serves for supplying the cooling liquid to the hollow conductors. This supply or distribution chamber 6 is connected by means of pipes 7, for instance made of stainless steel, to the hollow conductors of the coil ends 3, only one such pipe connection being shown in the figure for the sake of simplicity. Supply chamber 6 is also connected by means of a small number of flexible pipes or connections 8 and a corresponding number of radial bores 9 in the rotor shaft to an axial supply conduit in the rotor shaft. Chamber 6 is provided on its outer periphery with a number of openings which can be shut, so that the pipe connections are accessible when necessary.

The end plate part of the end turn retaining ring at the other end of the rotor is provided with a second distribution chamber which serves as a discharge chamber for the cooling liquid which comes out of the rotor winding and is connected in the same way to the coil ends on the one hand, and to the axial discharge conduit in the rotor shaft on the other hand.

Figure 2:
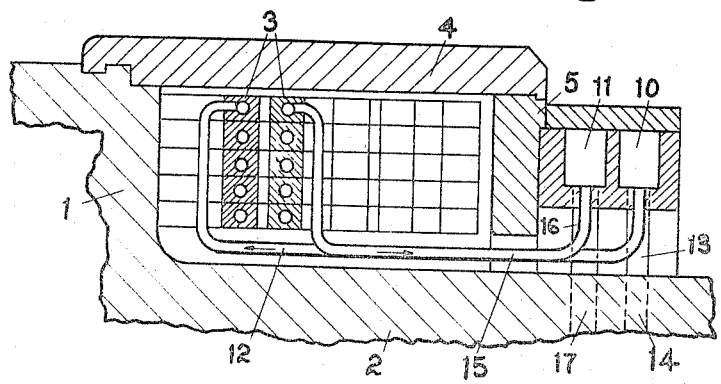

With the other constructional example illustrated in FIG. 2, the cooling liquid enters and leaves the rotor at the same end, that is to say a whole number of turns of the rotor winding are always connected hydraulically in series.

In FIG. 2 the same elements as in FIG. 1 are indicated by the same reference numbers. In this case there are two distribution chambers arranged on the outside of end plate 5, one which serves as a supply chamber 10 and the other chamber 11 is for the discharge of the cooling liquid. The supply chamber 10 is connected on the one hand by way of the pipes 12 with the hollow conductors of the end turns 3, and on the other hand by way of flexible pipe connections 13 and radial bores 14 in the rotor shaft with an axial supply conduit in the shaft. After the cooling liquid passes through the winding, it flows off through pipes 15 to the discharge chamber 11 and from there by way of flexible pipe connections 16 and radial bores 17 to an axial discharge conduit in the rotor shaft 2, this conduit not being shown in drawing.

Naturally, it is possible within the scope of the invention to make certain modifications to the constructional embodiments illustrated in the drawing. Thus, for instance, the supply and discharge chambers can also be located in the inner side of the end plate of the end turn retaining ring.

The arrangement according to the invention possesses the great advantage that the distribution chambers for the liquid cooling system of the rotor winding are not rigidly connected to the rotor shaft. Furthermore, any relative oscillations between the rotor shaft and the end turns of the winding have no effect on the distribution chambers and their connections to the winding. It is also important, that due to the arrangement according to the invention, the undesirable radial bores in the rotor shaft are reduced to a very small number when compared with previous systems.

I claim:

1. A liquid cooled rotor construction for a turbogenerator which comprises a rotor body, said rotor body having a winding thereon of hollow conductors including end turns at opposite ends of said rotor body and wherein a liquid coolant flows through turns of the winding connected hydraulically in series, an end turn retaining ring at each end of said rotor body, each said retaining ring including a cylindrical part secured upon said rotor body and an annular end plate the inner periphery of which is radially spaced from said rotor body, distribution chambers for the supply and discharge of the liquid coolant mounted on the end plate of at least one of said retaining rings, rigid pipe connections between said distribution chambers and said hollow end turns of said rotor winding, and flexible pipe connections between said distribution chambers and axially extending bores within the body of said rotor.

2. A liquid cooled rotor construction for a turbogenerator as defined in claim 1 wherein said distribution chambers are located at the inner side of said end plate.

3. A liquid cooled rotor construction for a turbogenerator as defined in claim 1 wherein said liquid coolant flows through an odd number of half-turns of said hollow conductor winding connected hydraulically in series, and wherein said supply and discharge chambers are located respectively on said end plates of said retaining rings at opposite ends of said rotor body.

4. A liquid cooled rotor construction for a turbogenerator as defined in claim 1 wherein said liquid coolant flows through a whole number of turns of said hollow conductor connected hydraulically in series, and wherein both said supply and discharge chambers are located on the same end plate of the retaining ring at one end of said rotor body.

5. A liquid cooled rotor construction for a turbogenerator as defined in claim 1 wherein said supply and discharge chambers for the liquid coolant have an annular configuration and from which pipe connections extend to said end turns and to the interior of rotor body, said annular chambers being provided with closeable openings on the outer periphery thereof providing access to said pipe connections.

6. A liquid cooled rotor construction for a turbogenerator which comprises a rotor body, said rotor body having thereon a winding of hollow conductors including end turns at opposite ends of the rotor body and wherein a liquid coolant flows through an odd number of half-turns of the winding connected hydraulically in series, an end turn retaining ring covering the end turns at each end of said rotor body, each said retaining ring being secured at one end thereof to said rotor body and including an annular end plate at the opposite end thereof the inner periphery of which is radially spaced from said rotor body, annular distribution chambers for supply and discharge of the liquid coolant mounted respectively on said end plates of said retaining rings at opposite ends of said rotor body, rigid pipe means connecting said liquid coolant distribution chambers respectively to said end turns of said winding at opposite ends of said rotor body, and flexible connection means connecting said liquid coolant distribution chambers with axially extending bores within said rotor body.

7. A liquid cooled rotor construction as defined in claim 6 wherein said annular distribution chambers for supply and discharge of said liquid coolant are each provided with closeable openings at the outer periphery thereof providing access to said pipe and conduit connections.

8. A liquid cooled rotor construction for a turbogenerator which comprises a rotor body, said rotor body having thereon a winding of hollow conductors including end turns at opposite ends of the rotor body and wherein a liquid coolant flows through a whole number of turns of the winding connected hydraulically in series, an end turn retaining ring covering said end turns at each end of said rotor body, each said retaining ring being secured at one end thereof to said rotor body and including an annular end plate at the opposite end thereof the inner periphery of which is radially spaced from said rotor body, annular distribution chambers for supply and discharge of the liquid coolant mounted on one and the same end plate at one end of said rotor body, rigid pipe means connecting said liquid coolant distribution chambers respectively to said hollow end turns of said winding located at the same end of said rotor body as are said liquid coolant distribution chambers, and flexible connection means connecting said liquid coolant distribution chambers with axially extending bores within said rotor body.

9. A liquid cooled rotor construction as defined in claim 8 wherein said annular distribution chambers for supply and discharge chambers of said liquid coolant are each provided with closeable openings at the outer periphery thereof providing access to said pipe and conduit connections.

References Cited
UNITED STATES PATENTS

| | | | |
|---|---|---|---|
| 3,034,003 | 5/1962 | Seidner | 310—61 |
| 3,097,317 | 7/1963 | Fechheimer | 310—54 |
| 3,131,321 | 4/1964 | Gibbs et al. | 310—54 |

MILTON O. HIRSHFIELD, *Primary Examiner.*

L. L. SMITH, *Assistant Examiner.*